United States Patent [19]

Herger

[11] Patent Number: 4,689,789

[45] Date of Patent: Aug. 25, 1987

[54] METHOD FOR PRODUCING INTERNAL CONNECTIONS BETWEEN TWO-TERMINAL EQUIPMENTS INSTALLED IN A BUS STRUCTURE AT ONE AND THE SAME SUBSCRIBER OF AN INTEGRATED SERVICES DIGITAL COMMUNICATION NETWORK

[75] Inventor: Paul Herger, Munich, Fed. Rep. of Germany

[73] Assignee: Siemens Aktiengesellschaft, Berlin and Munich, Fed. Rep. of Germany

[21] Appl. No.: 753,977

[22] Filed: Jul. 11, 1985

[30] Foreign Application Priority Data

Jul. 12, 1984 [DE] Fed. Rep. of Germany ....... 3425720

[51] Int. Cl.⁴ .......................... H04J 3/12; H04Q 11/04
[52] U.S. Cl. .................................... 370/110.1; 370/58; 370/67
[58] Field of Search .................. 370/110.1, 24, 32, 58, 370/15, 65, 66, 67, 85, 86; 379/93, 94, 95, 101

[56] References Cited

U.S. PATENT DOCUMENTS

| | | | |
|---|---|---|---|
| 3,760,103 | 9/1973 | Condon | 370/65 |
| 4,045,617 | 8/1977 | Schlicte | 370/65 |
| 4,328,586 | 5/1982 | Hansen | 370/32 |

Primary Examiner—Douglas W. Olms
Assistant Examiner—Wellington Chin
Attorney, Agent, or Firm—Hill, Van Santen, Steadman & Simpson

[57] ABSTRACT

A method is disclosed for producing internal connections between two terminal equipments installed in a bus structure at one and the same subscriber of an integrated services digital network. Given the assumption of a base connection of the subscriber via a two-wire line having two base channels and one control channel, the transmitting and receiving directions are interchanged with respect to the base channel employed for the internal connection. This interchange occurs in the course of an existing connection to the exchange upon use of the control channel, and is interchanged at one of the pieces of terminal equipment which is participating in the internal connection. The method is useful in the environment of a boss/secretary arrangement.

5 Claims, 3 Drawing Figures

METHOD FOR PRODUCING INTERNAL CONNECTIONS BETWEEN TWO-TERMINAL EQUIPMENTS INSTALLED IN A BUS STRUCTURE AT ONE AND THE SAME SUBSCRIBER OF AN INTEGRATED SERVICES DIGITAL COMMUNICATION NETWORK

BACKGROUND OF THE INVENTION

The invention relates to a method for producing internal connections between two terminal equipments installed in a ring or bus structure at one and the same subscriber of an integrated services digital network with a basic access of the subscriber to the exchange via a two-wire central office line. Two digital base channels having the same bit rate and a control channel having a bit rate lower in comparison thereto are provided in a connection between the subscriber terminal and the exchange, situated in a holding condition or state.

In an integrated services digital network of the above type, also refered to as ISDN, different telecommunications services which relate to voice, data, text, facsimile, still picture communication, and remote control information are combined into a uniform digital communications network.

In contrast to previous telecommunications networks, an ISDN subscriber has more than one terminal equipment and can simultaneously execute a plurality of activities with the network.

The execution of these activities occurs via a subscriber line circuit leading to the exchange on which two base channels, so-called B-channels witha bit rate of 64 K bits/s, are formed.

Also formed on this subscriber line circuit, particularly for the transmission of the control characters, is a control channel or D-channel, whose bit rate amounts to 16 K bits/s in the actual case. In addition to exchanging control characters, this D-channel, however, can also be used for the transmission of telemetry data, and packet-switched data.

There is also interest in being able to produce a connection between two terminal equipments of one and the same subscriber, i.e., an internal connection, for example in the case of a boss/secretary system. This is true when, in the course of a connection to terminal equipment of a different subscriber existing via the exchange, an inquiry is to be made, for example, from the secretary station to the boss station. Such internal connections, of course, can also be of interest between other arbitrary terminal equipment units of a subscriber.

However, there is no intent to lend the subscriber connection the properties of a private branch exchange wherein internal connections are also possible without the existence of a connection to the exchange.

SUMMARY OF THE INVENTION

An object of the present invention, given an integrated services digital communication network of the aforementioned type, is to enable internal connections between two terminal equipment units of one and the same subscriber in the course of a connection between the subscriber terminal and exchange, situated in a holding condition or state. For this purpose, the base channel occupied for the connection on hold should be exploited.

This object is achieved in accordance with the invention in that a switching technique is initiated by the exchange by use of a control channel at one of the terminal equipment units participating in the internal connection. With this switching technique, the transmission and reception direction are interchanged at this terminal equipment unit with respect to the base channel employed for the internal connection.

According to a further development of the invention, a specific code word is sent to the terminal equipment during the duration of the internal connection by the exchange in the base channel used for the internal connection. A disruption of the internal connection can be avoided in this fashion.

Yet another development of the invention is that in the course of an internal connection given information blocks transmitted in a transmission direction which would be the reception direction given a normal connection, a free bit belonging neither to a base channel nor to a control channel is used as a compensation bit for achieving a signal with low d.c. component. As a result of the conditions modified according to the invention given an internal connection, the techniques applied in normal operation cannot be applied in their standard form. This is taken into consideration by the above feature.

DESCRIPTION OF THE PREFERRED EMBODIMENTS

Figure 1:
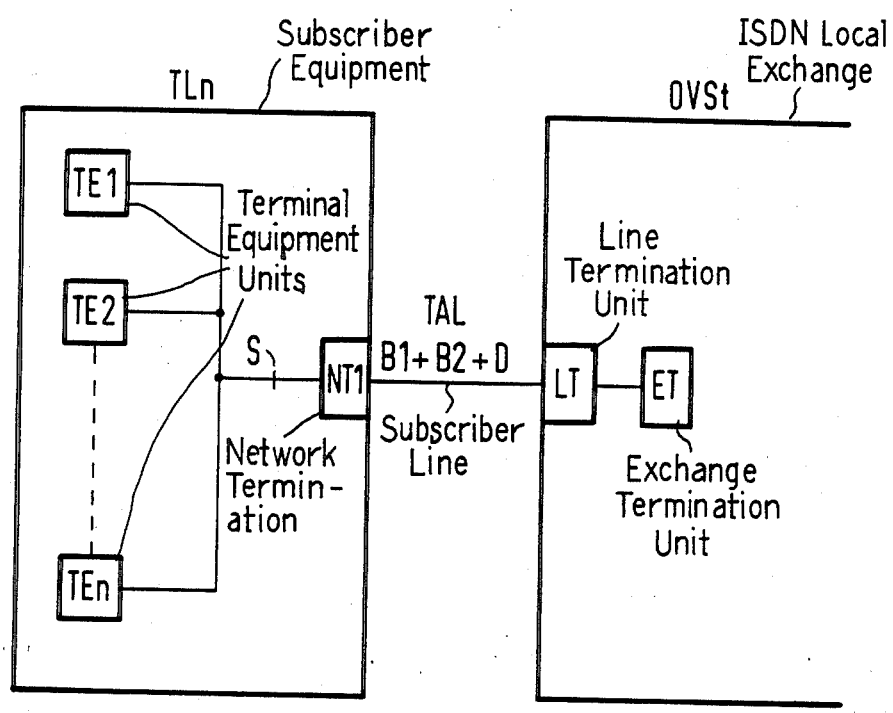
FIG. 1 illustrates the structure of a subscriber access at an ISDN exchange for a basic access.

Let the subscriber equipment TLN shown in FIG. 1 comprise n terminal equipment units TE1 through TEn, which can be telephones, data terminal equipment, equipment for facsimile transmission, and generators for telemetry data, i.e., data for protection or remote control purposes.

These types of terminal equipment are connected to a network termination unit NT1 via a bus, which is four-wire line. Essential jobs of the network termination NT1 are the production of the transmission-oriented properties of the interface to the subscriber line circuit and the device interface, the so-called S-interface.

The subscriber equipment TLn is connected via a subscriber line TAL to an ISDN local exchange ISDN-OVST, whereby a line termination unit LT as well as an exchange termination unit ET should also be mentioned here as components of the exchange which are of interest in this context. The line termination LT serves for the production of a line interface at the exchange side. The exchange termination unit ET represents the logical termination of the subscriber line at the exchange side.

As indicated, two base channels B and one control channel D are formed on the subscriber line TAL as a component of a time-division multiplex system.

Figure 2:
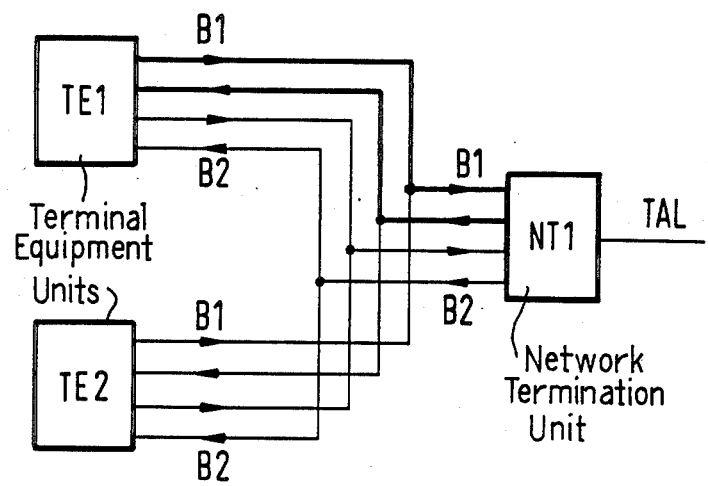
FIG. 2 shows from FIG. 1 first and second terminal equipment units, and illustrates a normal connection.

FIG. 2 shows two of the terminal equipment units TE1 and TE2, as well as the network termination unit NT1 of a subscriber, as has been explained with reference to FIG. 1.

The physical connection between the terminal equipment and the NT1 is a four-wire line, whereby the base channels B1 and B2 as well as the control channel are multiplexed on a two-wire line for each transmission direction. One connection for each base channel and for each direction has been shown in FIG. 2 as a departure from these conditions for a better understanding of the invention. The control channel is not taken into consideration in FIG. 2.

Normal operation has been assumed in FIG. 2, and it is indicated by a partially thicker line thickness that the terminal equipment unit TE1 is connected to the network termination unit NT1 upon use of the base channel B1 in the course of a connection to the exchange of the telecommunications system to which the subscriber termination belongs.

In addition to this connection, a connection of the subscriber terminal equipment unit TE2 would be possible upon exploitation of the base channel B2.

Figure 3:
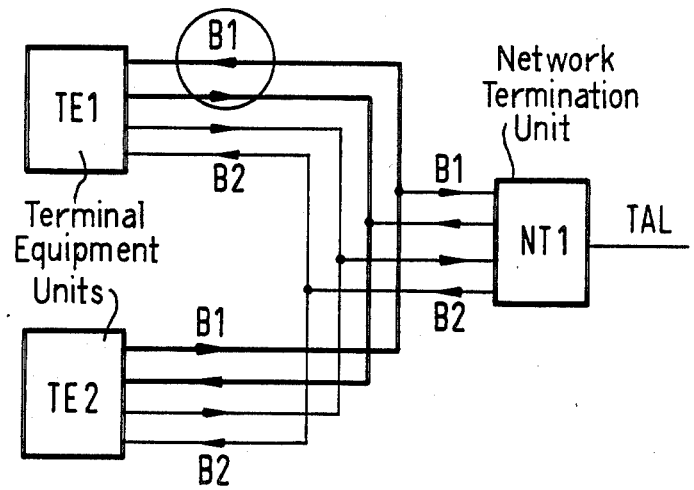
FIG. 3 shows terminal equipment units for illustrating an internal connection between the first and second terminal equipment units of the subscriber.

FIG. 3 then shows the conditions which prevail in the case of an internal connection according to the invention between the subscriber terminal equipment units TE1 and TE2.

It is presumed here that the base channel B1 is used for such an internal connection.

As may be seen from the reversal of the directional arrows relating to the base channel B1 at the subscriber terminal equipment unit TE1 (emphasized by a circle in FIG. 3), the reception and transmission direction have been interchanged at this subscriber equipment unit. This is capable of being performed internally by means of corresponding switching of the transmission and reception devices from one lead pair of the four-wire line to the other.

As emphasized by a heavier line thickness, the subscriber equipment unit TE1 thus directly transmits onto the line lead pair to which the reception device of the subscriber equipment unit TE2 is connected. Also, the information output by the subscriber equipment unit TE2 is transmitted onto the transmission branch of the four-wire line as in normal operation. It can be directly received by the subscriber equipment unit TE1 without this connection needing to proceed via the exchange.

The control of the switching events which are necessary for setting up such an internal connection occurs, by contrast, by the exchange, for which purpose the aforementioned D-channel is employed.

This internal connection is related to a normal connection originally existing between the one or the other of the terminal equipment units and the exchange, which is on hold during the duration of the internal connection.

In addition to the above explained internal connection, a further internal connection via the base channel B2 can exist between two further terminal equipment units, or a normal connection can exist between a further terminal equipment unit and the exchange.

In normal connections, the terminal equipment in the base channel which is respectively not used, usually transmits a defined idle bit pattern. When this base channel is used by a different terminal equipment unit, this idle bit pattern is combined with the useful information output from the other terminal equipment unit. Thus, a mutual disruption of the operation of the terminal equipment unit is prevented. In order to also produce corresponding conditions given an internal connection wherein two terminal equipment units use one and the same base channel, such a bit pattern is transmitted in the base channel used for the internal connection from the exchange during the duration of the internal connection.

In the transmission of information between terminal equipment and a network termination unit NT1, the zero bits are represented in normal operation by altered impulses of opposite polarity. This representation guarantees a relatively low d.c. component in the transmitted signal which would become zero in the case of an even plurality of zero bits. At least one matching or compensation bit for achieving freedom from d.c. is provided for every multiplex channel for the transmission direction from the terminal equipment to the network termination unit. Such compensation bits are not provided per multiplex channel for the transmission direction from the network termination unit to the terminal equipment in normal operation, since only one equipment unit (NT1) is transmitting.

Since, in the case of an internal connection from one of the terminal equipment units, this transmission direction is used as the transmitting direction, an additional matching or compensation bit is to be provided for this transmission direction.

Consequently, two additional matching or compensation bits are required for the simultaneous use of both base channels B1 and B2 for internal connections. Bit positions which, according to previous determinations, are still available for arbitrary purposes, can be employed for this purpose.

Further information concerning the procedures discussed above is set forth in CCITT Recommendation Document AP V III-97, incorporated herein by reference.

Although various minor changes and modifications might be proposed by those skilled in the art, it will be understood that I wish to include within the claims of the patent warranted hereon all such changes and modifications as reasonably come within my contribution to the art.

I claim as my invention:

1. A method for producing an internal connection between a plurality of commonly connected two-terminal equipment units installed at a subscriber terminal, said subscriber terminal being part of an integrated services digital communications network wherein a two-wire subscriber line connects the subscriber terminal to an exchange, wherein a ring or bus system interconnection is provided between the two-terminal equipment units, and wherein communication between the two-terminal equipment units and the exchange occurs over the subscriber line by use of at least one of two digital base channels each having a same given bit rate, and wherein at least one control channel is also provided having a lower bit rate in comparison to said given bit rate of said two channels, comprising steps of:
   providing an exchange connection between a first of said two-terminal equipment units and said exchange via one of said two digital base channels;
   placing said exchange connection on hold and initiating from the exchange by use of said control channel a switching operation at said first two-terminal equipment unit such that a transmitting and receiving direction on lines from said first equipment unit employed for said exchange connection via said one base channel are reversed so that said same first unit lines and same one base channel are used for producing said internal connection with a second of said two-terminal equipment units.

2. A method according to claim 1 wherein said second two-terminal equipment unit connects to said same lines.

3. A method according to claim 1 including the steps of providing a bus structure comprising first, second, third, and fourth lines interconnecting the first and second terminal equipment units, providing a network termination unit for connecting the two-wire subscriber line to said bus system, providing said exchange connection with first and second of said bus system lines, connecting a transmitter of the first terminal equipment unit to said first line and a receiver of said first terminal equipment unit to said second line for communicating with the exchange via said first digital base channel, connecting a transmitter of said second terminal equipment unit to said first bus structure line and its receiver to said second bus structure line, and given said switching initiated by the exchange via said control channel, switching the transmitter of the first two-terminal equipment unit from the first bus structure line to said second line and switching the receiver of said first two-terminal equipment unit from said second bus system line to said first bus system line.

4. A method according to claim 3 wherein when said internal connection between said first and second two-terminal equipment units is provided, transmitting information blocks from said first two-terminal equipment unit to said second two-terminal equipment unit via said one base channel, providing a free bit not belonging to said one base channel, the other base channel, nor the control channel, and employing said free bit as a compensation bit for achieving a signal with a low dc component.

5. A method for producing an internal connection between a plurailty of connected equipment units all installed at a common subscriber terminal, said subscriber terminal being part of an integrated services digital communiations network wherein a subscriber line connects the subscriber terminal to an exchange, and wherein communiation between the equipment units and the exchange occurs over the subscriber line by use of at least one digital base channel and at least one control channel, comprising steps of:

providing an exchange connection between a first of said equipment units and said exchange via said one digital base channel;

placing said exchange connection on hold and initiating from the exchange by use of said control channel a switching operation at said first equipment unit such that a transmitting and receiving direction on lines from said first equipment unit employed for said exchange connection via said one base channel are reversed so that said same first unit lines and same one base channel are used for producing said internal connection with a second of said equipment units connecting with said same lines.

* * * * *